United States Patent [19]

Funasaki et al.

[11] Patent Number: 4,518,032
[45] Date of Patent: May 21, 1985

[54] TEMPERATURE CONTROL APPARATUS FOR AUTOMOBILE AIR-CONDITIONING SYSTEMS

[75] Inventors: Ken Funasaki; Toshiki Iijima, both of Katsuta; Tsuneo Kagohata, Ibaraki, all of Japan

[73] Assignee: Hitachi, Ltd., Tokyo, Japan

[21] Appl. No.: 440,637

[22] Filed: Nov. 10, 1982

[30] Foreign Application Priority Data

Nov. 11, 1981 [JP] Japan ................................ 56-179719
Feb. 24, 1982 [JP] Japan ................................ 57-27307
Feb. 24, 1982 [JP] Japan ................................ 57-27317

[51] Int. Cl.³ .......................... F24F 7/00; B60H 1/00; B60H 3/00; B61D 27/00
[52] U.S. Cl. ........................................ 165/12; 165/16; 165/42; 165/43; 236/49; 236/38; 236/DIG. 9; 98/2.01
[58] Field of Search .............. 236/49, 38, DIG. 9; 165/16, 42, 43; 318/626; 98/2.01

[56] References Cited

U.S. PATENT DOCUMENTS

| | | | |
|---|---|---|---|
| 3,726,473 | 4/1973 | Sapir | 236/49 X |
| 3,795,853 | 3/1974 | Whitehouse | 318/626 X |
| 3,814,173 | 6/1974 | Coon | 165/12 |
| 3,948,312 | 4/1976 | Nisbet | 165/16 |
| 4,167,966 | 9/1979 | Freeman | 236/DIG. 9 X |
| 4,184,107 | 1/1980 | Turini et al. | 318/626 X |
| 4,244,517 | 1/1981 | Stanke et al. | 236/49 |
| 4,250,441 | 2/1981 | Chapman et al. | 318/626 |
| 4,267,967 | 5/1981 | Beck et al. | 236/49 |
| 4,289,195 | 9/1981 | Bellot et al. | 165/28 X |
| 4,364,513 | 12/1982 | Tsuzuki et al. | 165/43 X |
| 4,375,611 | 3/1983 | Greig | 318/626 |
| 4,408,713 | 10/1983 | Iijima et al. | 165/12 X |
| 4,416,324 | 11/1983 | Sutoh et al. | 165/12 |

FOREIGN PATENT DOCUMENTS

123515 9/1980 Japan ................................ 165/43

Primary Examiner—William R. Cline
Assistant Examiner—John K. Ford
Attorney, Agent, or Firm—Antonelli, Terry & Wands

[57] ABSTRACT

In an air conditioning system for automobiles including a temperature control apparatus having temperature setting device for setting a vehicle compartment temperature, a temperature sensing device for sensing an actual vehicle compartment temperature, a temperature difference signal device for generating a difference signal in accordance with a difference between the set vehicle compartment temperature and the sensed actual vehicle compartment temperature, and air flow control device for controlling the rate of air flow from a blower so as to provide varying air flow rates up to a maximum air flow rate in accordance with the value of the difference signal, a detecting device for detecting that the air condition system is at a heating operation, and a control arrangement responsive to the output from the detecting device and the value of the difference signal for controlling the air flow rate control device so that the rate of air flow from the blower is maintained at a predetermined flow rate which is less than the maximum air flow rate independent of the difference between the set temperature and the actual vehicle compartment temperature when the difference exceeds a predetermined value.

15 Claims, 13 Drawing Figures

TEMPERATURE CONTROL APPARATUS FOR AUTOMOBILE AIR-CONDITIONING SYSTEMS

BACKGROUND OF THE INVENTION

The present invention relates to air conditioning systems for automobiles and more particularly to a temperature control apparatus for an automobile air-conditioning system of a so-called reheat type in which the temperature of supply air is controlled by adjusting through an air mixing door the amount of the cooled air from an evaporator which is passed and heated through a heater core and the amount of the cooled air which bypasses the heater core.

In a known apparatus of this type, the temperature of supply air and hence the temperature inside the vehicle compartment of an automobile is controlled by adding together a value proportional to a temperature difference signal corresponding to the deviation or difference between a temperature preset by a temperature setting mechanism and the actual vehicle compartment temperature and a value derived by integrating the temperature difference signal to generate a temperature control signal and then controlling the position of the air mixing door within a range between a maximum heating position for supplying all the cooled air to the heater core and a maximum cooling position for supplying all the cooled air to bypass the heater core in accordance with the temperature control signal.

Also, it is so arranged that the amount of air flow from the blower is maintained at a minimum value as long as the temperature difference signal remains within a given range of positive and negative values, respectively, and upon exceeding the given range the amount of air flow is varied up to a maximum value in accordance with the value of the temperature difference signal.

As a result, the temperature control apparatus operates so as to satisfy the cooling power and the amount of heat required by the vehicle compartment by means of both the mixing ratio of heated or cooled air by the air mixing door and the amount of air flow from the blower.

In the air conditioning system, however, the cooling capacity of the evaporator is large as compared with the heating capacity of the heater core. Thus, the control characteristic of the temperature control apparatus must be varied depending on whether the heating or cooling is demanded.

SUMMARY OF THE INVENTION

It is an object of the present invention to provide a temperature control apparatus capable of providing the proper control characteristic to suit the operating conditions of an air conditioning system.

It is another object of the invention to prevent the occurrence of overheating during the maximum heating operation without degrading the cool-down characteristic of the maximum cooling operation.

It is still another object of the invention to prevent any abnormal rise of the vehicle compartment temperature during the heating operation.

It is still another object of the invention to prevent any sudden rise of the vehicle compartment temperature due to an increase in the air flow from the blower during the heating operation.

DESCRIPTION OF THE PREFERRED EMBODIMENT

Figure 1:
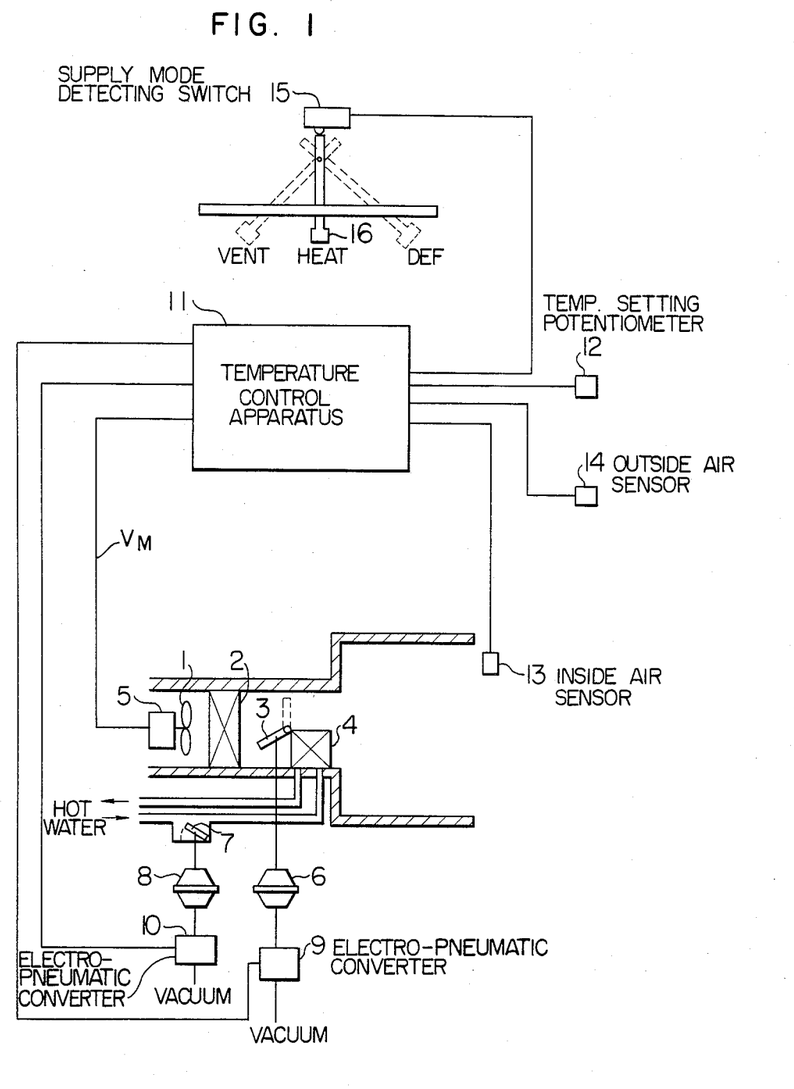
FIG. 1 is a diagram showing schematically an air conditioning system for automobiles to which the invention is applied.

In FIG. 1, the air drawn into a blower 1 is dehumidified and cooled by an evaporator 2 and the cooled air is divided into two portions, one which is passed through a heater core 4 by an air mixing door 3 (hereinafter referred to as an A/M door) and the other which bypasses the heater core 4. Consequently, by changing the position of the A/M door 3, it is possible to change the temperature of air delivered or the amount of heat discharged from the air conditioning system. On the other hand, by varying the voltage applied to a blower motor 5, it is possible to control the amount of air flow from the blower 1. Numeral 6 designates a power servo system for controlling the position of the A/M door 3, which is operated by means of the engine vacuum controlled by an electro-pneumatic converter or the like in accordance with a control signal. The temperature inside the vehicle compartment is detected by an inside air sensor 13, compared with a temperature preset by a temperature setting potentiometer 12 in a temperature control apparatus 11 and then compensated in accordance with the outside air temperature detected by an outside air sensor 14. With the cooled air passed through the evaporator 2, the proportion of the cooled air passed through the heater core 4 is controlled by the operation of the A/M door 3 through the electro-pneumatic converter 9 and the actuator 6 responsive to the signal from the temperature control apparatus 11. Also, the blower air flow rate is controlled in accordance with the voltage applied to the blower driving motor 5 and also a water cock 7 for controlling the supply of hot water to the heater core 4 is controlled simultaneously by an electro-pneumatic converter or solenoid valve 10 and an actuator 8. Also provided on a mode lever 16 is a supply mode detecting switch 15 for detecting that the air outlets are set to a heating position and the switch 15 applies to the temperature control apparatus 11 a command for using the automobile air conditioning system for heating purposes, thereby producing within the temperature control apparatus 11 a blower air flow rate characteristic and a water cock control characteristic which are different from those used for the cooling purpose.

Figure 5:
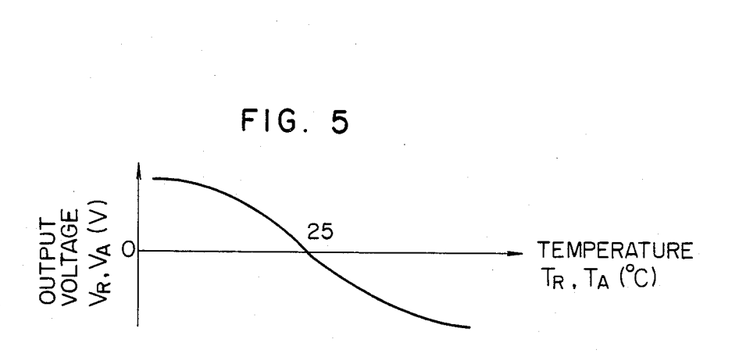
FIG. 5 is a graph showing the output characteristic of an outside air temperature sensor and an inside air temperature sensor, respectively.
Figure 6:
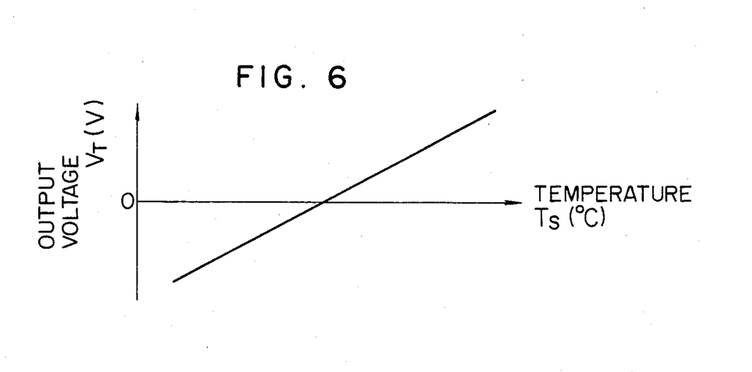
FIG. 6 is an output characteristic diagram of a temperature setting potentiometer whose output is applied to the temperature control apparatus according to the invention.

An embodiment of control circuitry for the apparatus according to the invention will now be described with reference to FIG. 2. The inputs are supplied from the temperature setting potentiometer 12, the inside air sensor 13 for detecting the temperature inside the vehicle compartment, the outside air sensor 14 for detecting the temperature outside the vehicle compartment, an A/M door potentiometer 90 for detecting the position of the A/M door for varying the supply air temperature and the supply mode detecting switch 15 which is opened when a vent position (an upper supply mode) is selected for the air outlets and closed when a heat position (a lower supply mode) is selected for the air outlets. Here, each of the inside and outside air sensors 13 and 14 has a characteristic such that while the output voltage decreases nonlinearly with increase in the temperature, the characteristic can be considered practically linear within a temperature range of 10° to 40° C. which is important from the air conditioning point of view as shown in FIG. 5. Also, as shown in FIG. 6, the output voltage of the temperature setting potentiometer 12 increases linearly with increase in the preset temperature.

Figure 7:
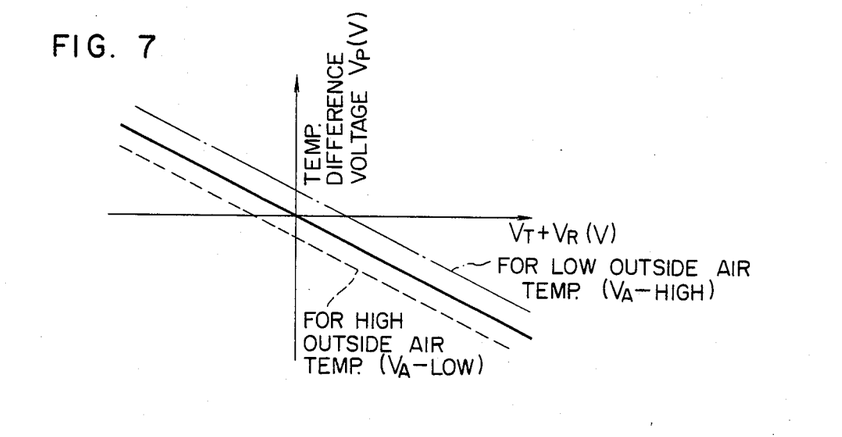
FIG. 7 is an output characteristic diagram of a temperature difference computing circuit in the temperature control apparatus according to the invention.

Next, as regards the computing control functions, a temperature difference computing circuit 101 computes a temperature difference signal $V_P$ corresponding to the difference between a preset temperature $T_S$ and an inside air temperature $T_R$. In FIG. 7 showing the characteristic of this circuit, the inside air sensor output voltage $V_R$ and the preset temperature output voltage $V_T$ change in phase opposition with temperature changes and consequently the temperature difference voltage $V_P$ is represented by the result of an algebraic addition of the voltages $V_T$ and $V_R$. In addition, to provide more comfortable air conditioning in response to changes in the outside air temperature $T_A$, the apparent preset temperature is varied with the variation of $T_A$ so that the characteristic of the circuit 101 is changed to become as shown by the dot-and-dash line when the outside air temperature is low and as shown by the broken line when the outside air temperature is high.

The following proportional plus integral computing circuit 102 performs the operation of proportional amplification and time integration on the voltage $V_P$ and combines the results so as to obtain a control voltage $V_X$ which determines the control position of the A/M door 3. The computing expression of the circuit is given by the following equation (1) and in this embodiment it is determined so that $K_1 = 1$ and $K_2 = 680$.

$$V_X = K_1 V_P + \frac{1}{K_2} \int_0^t V_P \, dt \tag{1}$$

The following control voltage limiting circuit 103 is so designed that in order to eliminate any ill effect in the performance of the proportional plus integral control due to the control voltage $V_X$ exceeding the range of mechanical response of the A/M door 3, if the control voltage $V_X$ varies to go beyond the range of mechanical response, the control voltage $V_X$ is limited to a value which produces no adverse effect and is generated as an A/M door position voltage $V_D$.

Figure 2:
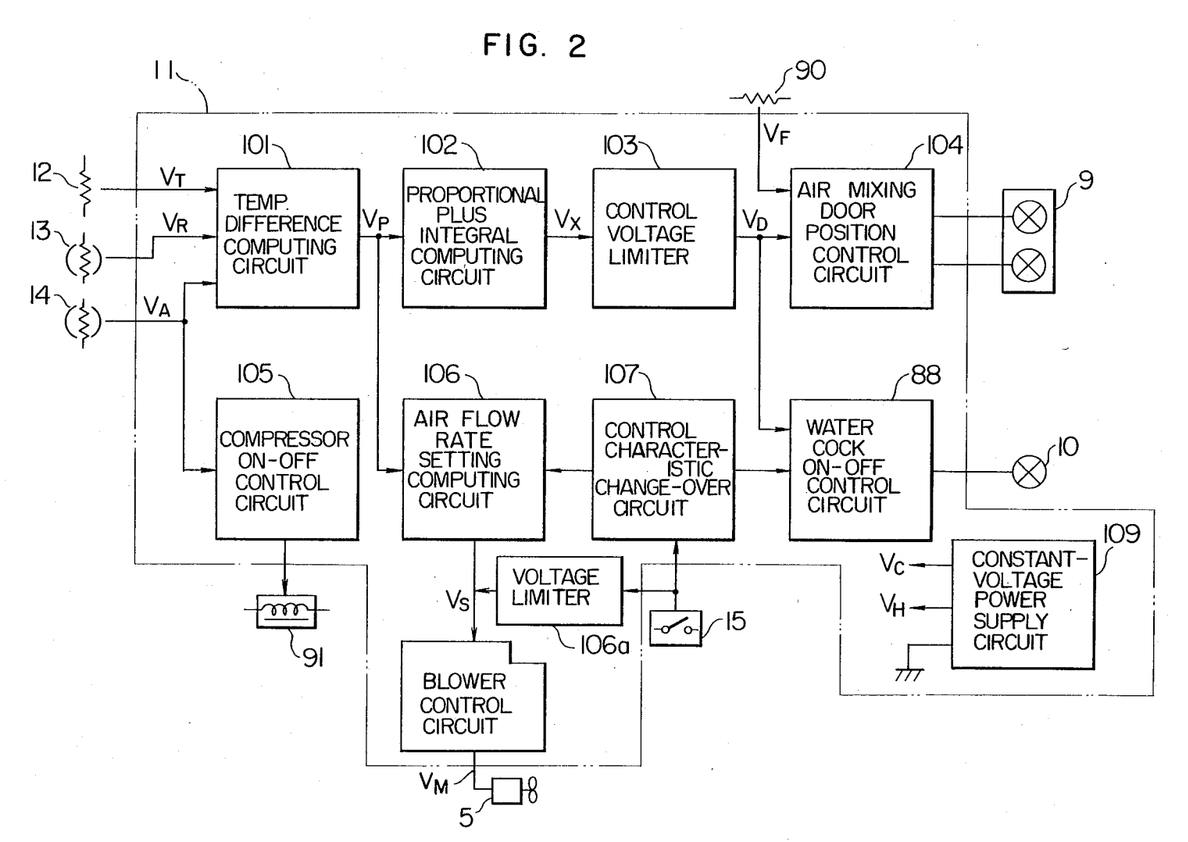
FIG. 2 is a functional block diagram of a temperature control apparatus according to the invention.
Figure 8:
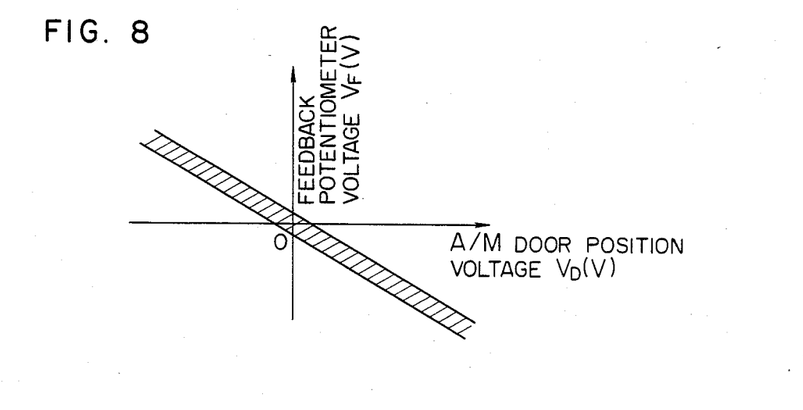
FIG. 8 is an output characteristic diagram of an air mixing door position control circuit in the temperature control apparatus according to the invention.

In FIG. 2, numeral 104 designates an A/M door position control circuit for actuating the electro-pneumatic converter 9 connected to its output terminals and controlling the A/M door position to an angle corresponding to the value of the A/M door position voltage $V_D$. FIG. 8 shows the characteristic of this circuit which compares the position voltage $V_D$ with a feedback potentiometer voltage $V_F$ proportional to the position of the A/M door 3 and controls the operation of the electro-pneumatic converter 9 to remain within the hatched region.

Figure 9:
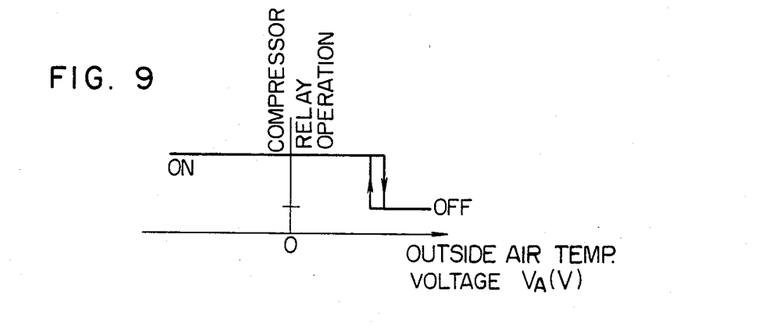
FIG. 9 is an output characteristic diagram of a compressor ON-OFF control circuit in the temperature control apparatus according to the invention.

Numeral 105 designates a compressor ON-OFF control circuit for stopping, as shown by the characteristic diagram of FIG. 9, the compressor by turning off a compresser driving relay 91 when the outside air temperature voltage $V_A$ is higher than a predetermined value or the outside air temperature $T_A$ is lower than a predetermined value.

Numeral 107 designates a characteristic change-over control circuit receiving the signal from the supply mode detecting switch 15 to generate a signal for varying the air flow rate control characteristic and the water cock (W/C) ON-OFF characteristic between the upper supply mode and the lower supply mode.

Figure 10:
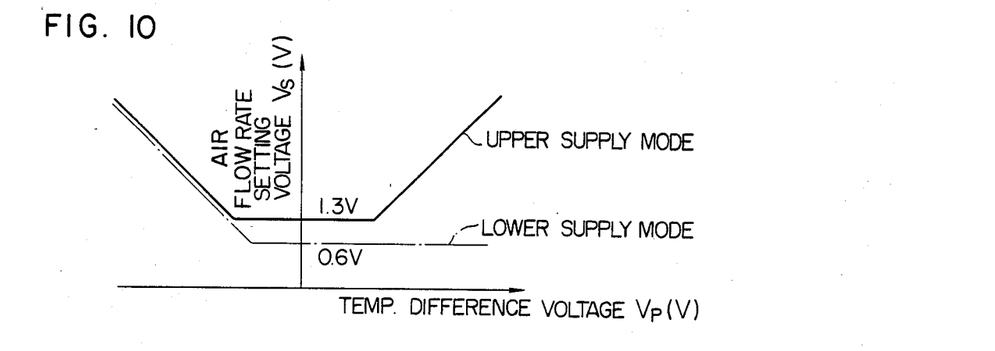
FIG. 10 is an output characteristic diagram of an air flow setting signal computing circuit in the temperature control apparatus according to the invention.
Figure 13:
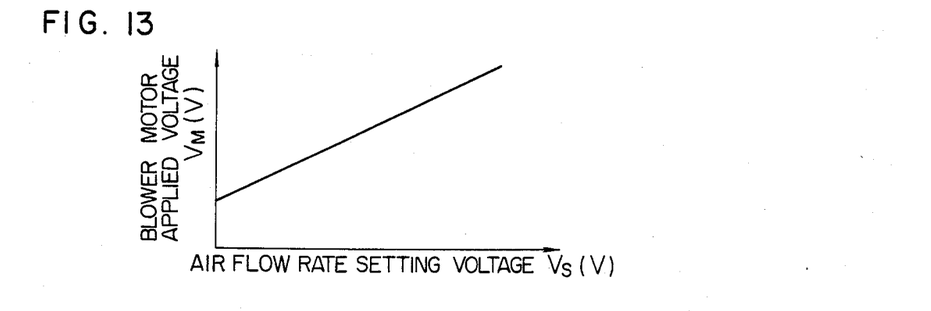
FIG. 13 is an input/output characteristic diagram of an air flow rate control circuit in the temperature control apparatus according to the invention.

On the other hand, an air flow rate setting signal computing circuit 106 receives the temperature difference voltage $V_P$ and functions to generate an air flow rate setting signal $V_S$ such that a low air flow rate is selected as a basic characteristic when the preset temperature and the inside air temperature are substantially the same and the air flow rate is increased as the temperature difference increases. In accordance with the present embodiment, as shown in FIG. 10, while the air flow rate voltage $V_S$ increases with increase in the absolute value of the temperature difference voltage $V_P$ in the upper supply mode, the minimum air flow rate voltage is preset relatively high so as to ensure a cooling capacity greater than a given value. Also, the characteristic for the lower supply mode is such that the air flow rate voltage is decreased and that when the value of the temperature difference voltage $V_P$ is positive the air flow rate voltage $V_S$ is not increased so as to prevent uncomfortable feeling on the part of the vehicle occupants. This change-over between the characteristics is effected by a voltage limiter 106a receiving the signal from the characteristic change-over circuit 107. Also, the blower motor applied voltage $V_M$ or the supply air flow rate is varied with variation in the air flow rate setting voltage $V_S$ as shown in FIG. 13 and thus the ordinate in FIG. 10 can be considered as such to indicate the air flow rate.

On the other hand, a W/C ON-OFF control circuit 108 controls the opening and closing of the W/C through the solenoid valve 10 which is connected to its output terminal and it operates in such a manner that the W/C is always opened in the lower supply mode and in the upper supply mode the A/M door position voltage $V_D$ is received so that the W/C is closed when the voltage $V_D$ is higher than a given value or the A/M door 3 is controlled to its full-cool position.

In addition to the foregoing, in FIG. 2 a constant-voltage power supply circuit 109 functions to generate a constant power supply voltage $V_C$ for stabilizing the operation of the circuits against great variations in the automobile power supply voltage and a reference voltage $V_H$ which is used as a reference for the signal computation.

By using the control circuitry constructed as described hereinabove, it is possible to realize an automatic temperature control which automatically controls the temperature of supply air by the proportional plus integral control method and thereby always controls the vehicle compartment temperature at a preset temperature.

Figure 3:
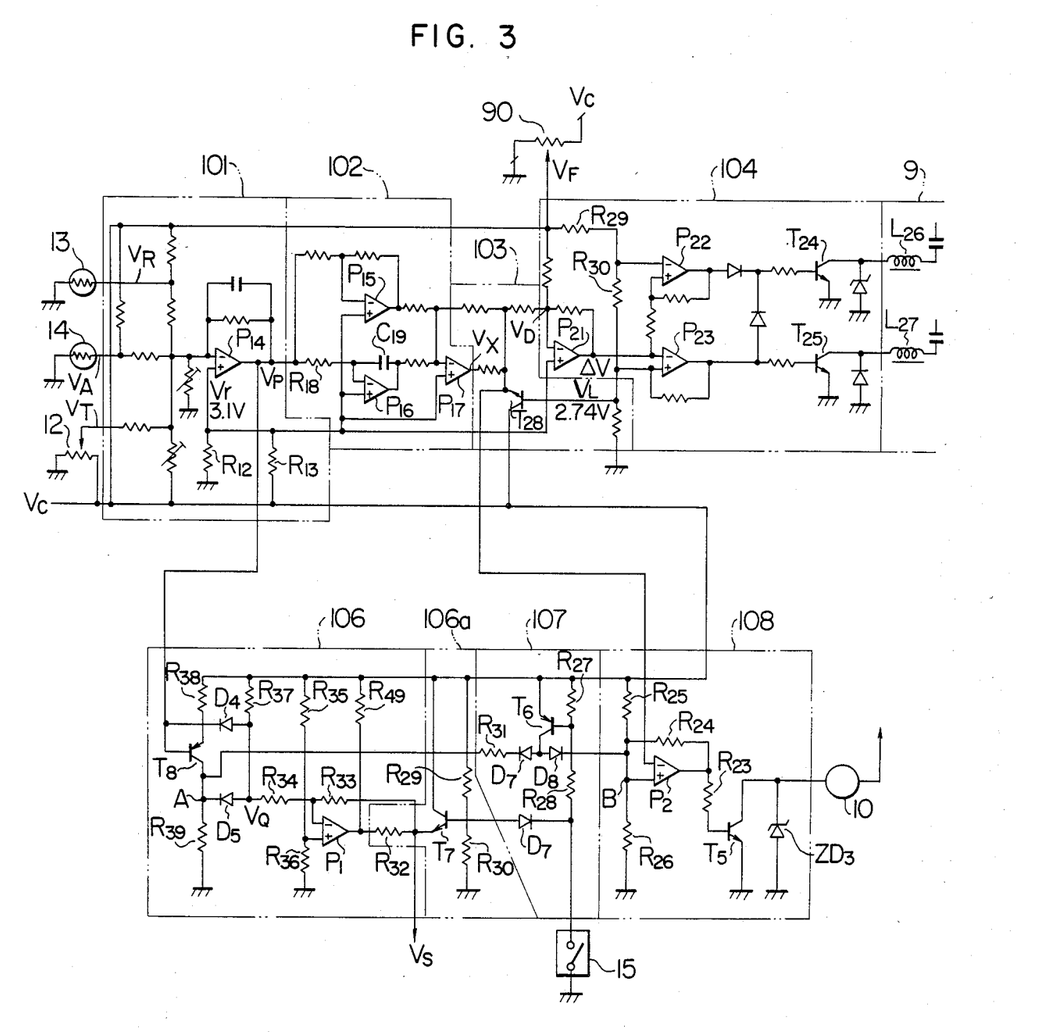
FIG. 3 is a circuit diagram showing an embodiment of the temperature control apparatus according to the invention.

A specific embodiment of this circuitry will now be described in detail with reference to FIG. 3. The vehicle compartment temperature, the outside air temperature and the preset temperature are converted to electric signals by the vehicle compartment temperature sensor 13, the outside temperature sensor 14 and the vehicle compartment temperature setting means 12, respectively, and the difference $\Delta T$ between the sum of these signals and a reference voltage $V_r$ is generated as a signal $V_P$ from an operational amplifier P14. The reference voltage $V_r$ is obtained by dividing the circuit reference voltage $V_C$ through resistors R12 and R13 and it becomes $V_P = V_r$ when the vehicle compartment temperature, the outside temperature and the preset temperature are equal to one another.

The voltage $V_P$ is subjected to a proportional plus integral action in a circuit comprising operational amplifiers P15, P16 and P17 and it is generated as an air mixing door control signal $V_X$. This control signal $V_X$ is represented by the equation (1) mentioned previously. The integration constant $K_2$ is determined by a resistor R18 and a capacitor C19. The control signal $V_X$ is supplied to the control voltage limiting circuit 103 which provides the control signal $V_D$ such that the output signal may correspond to $V_X$ or be limited. Such control signal and the voltage $V_F$ from the feedback potentiometer 90 for detecting the position of the A/M door 3 are applied to an operational amplifier P21 and the difference $\Delta V$ between the sum of the two inputs and the reference voltage $V_r$ is generated from the operational amplifier P21. This difference $\Delta V$ is used to turn on and off air valves L26 and L27 through operational amplifiers P22 and P23, transistors T24 and T25, etc., and the atmospheric pressure or the vacuum is introduced into the power servo system 9 to operate the A/M door 3.

Numeral T28 designates an NPN transistor for limiting the control signal $V_D$. The control signal voltage $V_X$ is applied to the emitter of the transistor T28 whose collector and base are respectively supplied with the circuit reference voltage $V_C$ and a voltage $V_L$ obtained by dividing the voltage $V_C$ through resistors R29 and R30. When the voltage $V_D$ becomes lower than the voltage $V_L$ by 0.6 V, the transistor T28 is turned on so that the current caused by the voltage $V_C$ flows from the collector to the emitter and the control signal voltage $V_X$ is prevented from dropping below the voltage $V_L$ minus 0.6 V.

Figure 4:
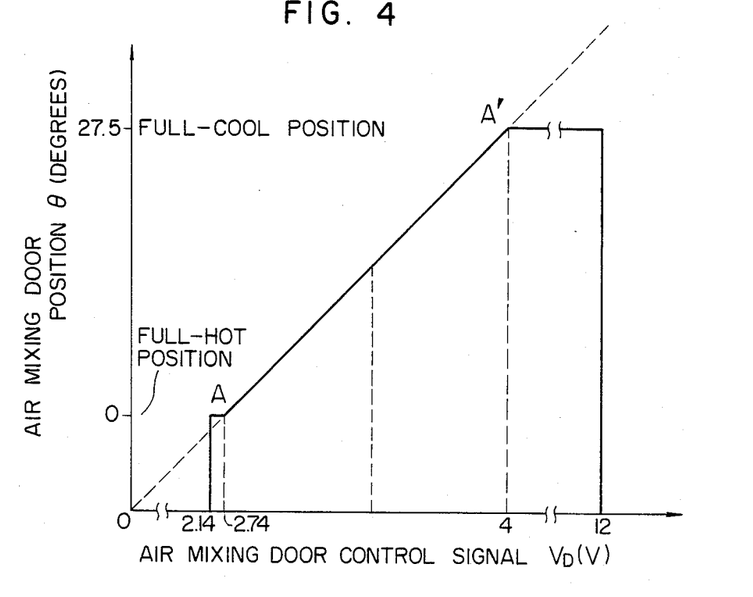
FIG. 4 is a graph showing the air mixing door position characteristic of an automobile air conditioning system incorporating the invention with respect to the temperature control signal from the temperature control apparatus according to the invention.

In this way, the minimum value of the A/M door control signal voltage $V_X$ is held at the voltage $V_L$ minus 0.6 V and a limiting action is performed on the minimum value of $V_X$ by the constant voltage $V_L$. This minimum value of $V_X$ is selected to practically correspond to the full-heat position in the A/M door operating range as shown in FIG. 4 and the deviation is essentially zero at this full-heat position. On the contrary, as regards the full-cool position, the control circuitry provides no limiting action at all and the possible value of $V_X$ may be such that a comparison between the cooling and heating operations shows that if it is fixed $T_S = 25°$ C., at the beginning of the cooling or heating cycle the difference between the temperature $T_R$ and $T_S$ or the value of $\Delta T$ is about 10° to 15° C. on the cooling and about 20° to 25° C. on the heating, showing that the difference is greater on the heating cycle. Thus, there is a disadvantage that since the proportion of the integration term in the control signal increases during the heating, if the control signal range is made greater than the actual operating range of the A/M door 3, during the heating the integration term is increased with the result that when it becomes $T_R > T_S$, a considerable time is required before the A/M door 3 is moved in a direction toward the cooling and therefore the vehicle compartment temperature overshoots or becomes excessively high.

In accordance with this embodiment, the occurrence of any overheating on the heating cycle is prevented by the provision of the limiter 103 by which a control signal generated by obtaining a difference signal between the preset temperature and the vehicle compartment temperature and performing a proportional plus integral operation on the reference signal by the computing means is prevented from exceeding a value ($V_D = 2.14$ V) corresponding to the full-hot opening or position of the A/M door which varies the ratio between the cooled air and the heated air which are supplied into the vehicle compartment.

Also, during the cooling where the proportion of the integration term decreases, the control signal is allowed to exceed the full-cool position by a predetermined value so as to provide an overcooling condition and thereby improve the cool-down characteristic.

Next, an embodiment of the air flow rate setting signal computing circuit 106, the characteristic changeover control circuit 107 and the W/C ON-OFF control circuit 108, respectively, will be described with reference to FIG. 3.

Figure 12:
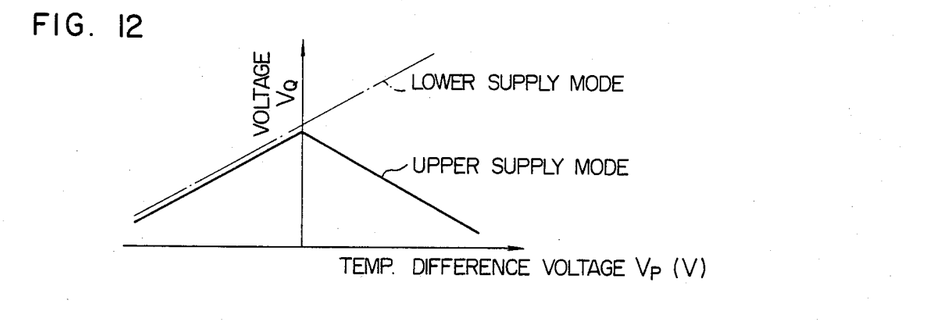
FIG. 12 is a characteristic diagram showing the internal voltage of an air flow rate setting signal computing circuit in the temperature control apparatus according to the invention.

Referring first to the air flow rate setting signal computing circuit 106, circuit elements R37 to R39, D4, D5 and T8 form an inverse absolute value circuit for the variation of the difference voltage $V_P$. If the values of R34 and R37 are selected sufficiently large relative to that of R39, the current flowing through the R38 practically flows as such into the R39. As a result, if it is selected R38 ≈ R39, then the potential at a point A varies in opposite phase and at the same rate of change as the variation of the voltage $V_P$. The potential at the point A and the input voltage $V_P$ are passed through the D4, D5 and R37 forming an analogical AND circuit and the resulting voltage $V_Q$ varies in substantially the same manner with the voltage $V_P$ as shown by the dot-and-dash line in FIG. 12.

On the other hand, an operational amplifier P1 and resistors 33 to 36 form an inverting amplifier circuit.

Consequently, using the voltage divided by the resistors R35 and R36 as a reference, the voltage $V_Q$ is inversely amplified and generated at a terminal $V_S$. Note that the circuit 106a comprising elements R29, R30, R32 and T7 serves as a voltage limiter so that only when the emitter potential of the T7 is low as compared with its base potential which is maintained at a given voltage, the transistor T7 is turned on and the decrease in its emitter potential or the voltage $V_S$ is limited. This limit voltage varies depending on the ON/OFF operations of the supply mode detecting switch 15 such that the voltage is set to about zero V when the switch 15 is turned on and set to about 1.3 V when the switch 15 is turned off. Also, the minimum output voltage of the operational amplifier P1 is held at about 0.6 V by its internal saturation voltage. As a result, the air flow rate setting signal computing circuit 106 first converts the temperature difference voltage $V_P$ to the voltage $V_Q$ and then to the air flow rate setting voltage $V_S$ shown in FIG. 10.

Figure 11:
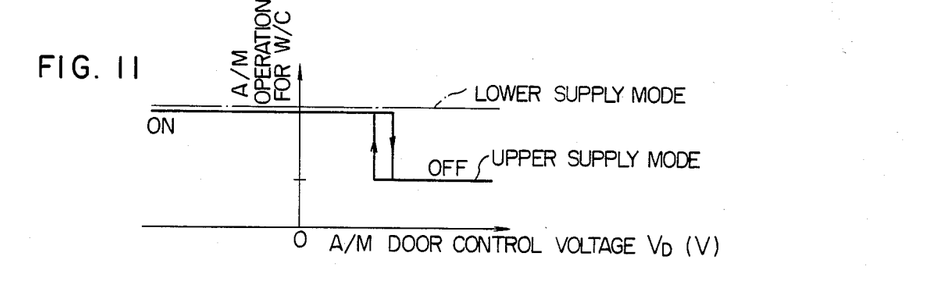
FIG. 11 is an output characteristic diagram of a water cock ON-OFF control circuit in the temperature control apparatus according to the invention.

Then, in the W/C ON-OFF control circuit 108, an operational amplifier P2 and resistors R24 to R26 form a comparator with a hysteresis. Thus, the output of the operational amplifier P2 becomes Lo when the input voltage $V_D$ is higher than the reference voltage produced by voltage division through the resistors R25 and R26 and it becomes Hi when the reverse is the case. On the other hand, in the lower supply mode the characteristic change-over control circuit 107 supplies a current to a point B so that the reference potential of the operational amplifier P2 is raised and thus its output is maintained at the Hi. The solenoid valve 10 for opening and closing the W/C is connected to the collector of a transistor T5 so that the solenoid valve 10 is opened and closed as the output of the operational amplifier P2 goes to the Hi and Lo, respectively, and hence it is opened and closed in response to the A/M door position voltage $V_D$ as shown in FIG. 11.

The characteristic change-over control circuit 107 operates in a manner that while it has no effect on the other circuits when the supply mode detecting switch 15 is off or in the upper supply mode, when the switch 15 is turned on the base potential of the transistor T7 is decreased changing the limit voltage to zero V and also the base potential of a transistor T6 is decreased turning it on, thereby supplying the current to the points A and B.

Since the amount of the heat generated by the heating apparatus is large, there is a case where the vehicle compartment temperature rises and the temperature difference $T_P$ is increased in the positive direction. While, in such a case, the A/M door is moved from the hot side to the cool side, even if the A/M door is moved to the full-cool position and the air flow rate is maintained at a low air flow rate $F_L$, the vehicle compartment temperature still rises depending on such conditions as the solar radiation. In such a case, the value of the temperature difference becomes positive and the air flow rate control characteristic is changed over to the cooling mode of operation, thus increasing the air flow rate and thereby increasing the amount of heat discharged from the air outlets. This increases the temperature difference further in the positive direction and hence the vehicle compartment temperature rises further. Eventually, the point is reached where the temperature difference diverges in the positive direction and the control of the vehicle compartment temperature is made impossible, thus causing the vehicle compartment temperature to rise abnormally and thereby causing exceedingly unpleasing feeling on the part of the vehicle occupants.

In accordance with the present embodiment, an excellent air conditioning characteristic is provided on both the cooling and heating cycles by virtue of the fact that the water cock is turned off when the air mixing door is at or near the full-cool position and turned on at all times during the heating and that the different control characteristics are used between the cooling and heating cycles so that the blower air flow rate characteristic is also varied so as to prevent the air flow rate from increasing during the heating even if the vehicle compartment temperature exceeds the preset temperature thereby preventing any rapid increase of the vehicle compartment temperature.

Further, in accordance with this embodiment the abnormal rise in the vehicle compartment temperature during the heating operation is further reduced by the provision of the air flow rate setting circuit which generates a heating cycle minimum air flow rate setting signal in response to the application of both a temperature difference signal and a heating condition detection signal.

From the foregoing description it will be seen that in accordance with the present invention the change-over between the two temperature control characteristics is effected depending on whether the air conditioning system is in the cooling condition or the heating condition thereby providing a comfortable temperature control throughout the range of operating conditions.

In particular, there is no danger of over-heating on the heating cycle by virtue of the fact that the temperature control signal is prevented from exceeding a value corresponding to the full-hot position of the air mixing door.

Further, the temperature control during the heating operation can be accomplished smoothly by virtue of the fact that during the heating the blower air flow rate is maintained at a constant low rate and the temperature control is accomplished by means of the air mixing door alone.

Still further, during the heating operation the characteristic is changed over from one type to another so as to reduce the minimum air flow rate than during the cooling operation, thereby further preventing any over-heating on the heating cycle and ensuring a comfortable temperature control.

We claim:

1. In an air conditioning system for automobiles including air flow rate control means for controlling the rate of air flow from a blower in accordance with the difference between a preset vehicle compartment temperature established by temperature setting means and an actual vehicle compartment temperature detected by an inside air sensor, a temperature control apparatus comprising:
   first means for detecting that said air conditioning system is at a heating operation; and
   second means operable in response to a signal generated from said first means during said heating operation whereby said rate of air flow is maintained at a predetermined flow rate below a maximum flow rate of the blower irrespective of the difference between said preset temperature and said vehicle compartment temperature when said difference exceeds a predetermined value.

2. An apparatus according to claim 1, wherein said first means comprises cooling/heating detecting means for generating a heating signal when an air outlet selector of said air conditioning system is at a heating position, and wherein said second means comprises a temperature difference computing circuit for subtracting a preset temperature signal generated by said temperature setting means from a detected temperature signal generated from said inside air sensor to generate a temperature difference signal, and means for maintaining said rate of air flow at said predetermined flow rate at least in response to the application of said temperature difference signal exceeding said predetermined value and said heating signal from said cooling/heating detecting means.

3. An apparatus according to claim 1, further comprising means operable in response to a signal generated from said first means when said air conditioning system is at a cooling operation whereby the circulation of hot water to a heating heater core is stopped when an air mixing door position control signal generated in accordance with the difference between said preset temperature and said vehicle compartment temperature attains a value corresponding to a maximum cooling position of an air mixing door.

4. An apparatus according to claim 1, wherein said second means comprises means for setting said predetermined air flow rate during said heating operation to a lower level than a minimum air flow rate during said cooling operation.

5. An apparatus according to claim 4, further comprising:
   temperature difference signal generating means for producing a signal representing the difference between the preset temperature and the actual vehicle compartment temperature;
   computing means for performing a proportional plug integral operation on said difference signal;
   control means responsive to a control signal generated from said computing means to control the position of an air mixing door for changing the ratio between cooled air and heated air which are supplied to said vehicle compartment; and
   a limiter for preventing said control signal from said computing means from exceeding a value corresponding to a heating maximum opening of said air mixing door.

6. An apparatus according to claim 5, wherein said limiter comprises means for limiting said control signal when said control signal decreases below a predetermined value.

7. An apparatus according to claim 6, wherein said limiter comprises a transistor which is turned on when said control signal decreases below said predetermined value.

8. In an air conditioning system for automobiles including a temperature control apparatus having temperature setting means for setting a vehicle compartment temperature, temperature sensing means for sensing an actual vehicle compartment temperature, temperature difference signal means responsive to the temperature setting means and the temperature sensing means for generating a difference signal in accordance with a difference between the set vehicle compartment temperature and the sensed actual vehicle compartment temperature, and air flow rate control means responsive to the temperature difference signal means for controlling the rate of air flow from the blower so as to provide varying air flow rates up to a maximum air flow rate in accordance with the value of the difference signal, the improvement comprising detecting means for detecting that the air conditioning system is at a heating operation and for providing an output signal indicative thereof, and controlling means responsive to the output signal from the detecting means and the difference signal from the temperature difference signal means for controlling the air flow rate control means so that the rate of air flow from the blower is maintained at a predetermined flow rate which is less than the maximum air flow rate independent of the difference between the set temperature and the actual vehicle compartment temperature when the difference exceeds a predetermind value.

9. An apparatus according to claim 8, wherein the detecting means includes cooling/heating detecting means for generating a heating output signal when an air outlet selector of the air conditioning system is at a heating position, and wherein the temperature difference signal means includes a temperature difference computing circuit for subtracting a set temperature signal generated by the temperature setting means from a sensed temperature signal generated by the temperature sensing means, the temperature difference computing circuit providing a temperature difference signal of one of a negative and positive value, the controlling means controlling the air flow rate control means to maintain the blower at the predetermined flow rate when the difference signal is a positive value and exceeds the predetermined value.

10. An apparatus according to claim 8, wherein the detecting means further detects that the air conditioning system is at a cooling operation and for generating a cooling output signal in accordance therewith, air mixing door position control signal generating means responsive to the difference signal from the difference signal generating means for generating an air mixing door position control signal in accordance therewith, and means responsive to the cooling output signal of the detecting means and the air mixing door position control signal for stopping the circulation of hot water to a heating heater core when the air conditioning system is at the cooling operation and the air mixing door position control signal attains a value corresponding to a maximum cooling position of an air mixing door.

11. An apparatus according to claim 8, wherein the controlling means includes for setting the predetermined air flow rate for the blower during the heating operation to a lower air flow rate than a minimum air flow rate utilized during a cooling operation.

12. An apparatus according to claim 8, further comprising computing means responsive to the difference signal from the temperature difference signal means for performing a proportional plug integral operation on the difference signal and generating a computed output signal in accordance therewith, an air mixing door control means responsive to the computer output signal from the computing means for controlling the position of an air mixing door for changing the ratio between cooled air and heater air which are supplied to the vehicle compartment, and limiter means for preventing the computed output signal from the computing means from exceeding a value corresponding to a heating maximum opening position of the air mixing door.

13. An apparatus according to claim 12, wherein the limiter means includes means for limiting the computed output signal of the computing means when the computed output signal decreases below a predetermined value.

14. An apparatus according to claim 13, wherein the limiting means comprises a transistor which is turned on when the computed output signal of the computer means decreases below the predetermined value.

15. An apparatus according to claim 8, wherein the air conditioning system is of a reheat type of air conditioning system.

* * * * *